United States Patent [19]

Simons et al.

[11] Patent Number: 4,981,905

[45] Date of Patent: Jan. 1, 1991

[54] WATER REDUCIBLE POLYESTER RESIN COMPOSITION AND METHOD FOR PREPARING SAME

[75] Inventors: James B. Simons, Greer; Barton L. Hedrick, Simpsonville, both of S.C.

[73] Assignee: Morton International, Inc., Chicago, Ill.

[21] Appl. No.: 313,218

[22] Filed: Feb. 21, 1989

[51] Int. Cl.$^5$ ............................................. C08L 67/02
[52] U.S. Cl. .................................... 524/603; 524/604; 528/87; 528/272; 528/296; 528/297; 528/300; 525/438; 523/400
[58] Field of Search ............... 528/272, 296, 297, 300, 528/87; 525/438; 523/400; 524/603, 604

[56] References Cited

U.S. PATENT DOCUMENTS 4,222,919  9/1980  Aluotto et al. ...................... 523/416
4,390,688  6/1983  Walz et al. ........................ 528/295.3

*Primary Examiner*—John Kight, III
*Assistant Examiner*—S. A. Acquah
*Attorney, Agent, or Firm*—Gerald K. White

[57] ABSTRACT

High molecular weight, water reducible or dispersible polyester resin compositions are prepared by dispersing a molten carboxyl-containing polyester in water and chain extending it with an epoxide. The dispersions are useful as sizes for textiles and as coatings.

10 Claims, No Drawings

WATER REDUCIBLE POLYESTER RESIN COMPOSITION AND METHOD FOR PREPARING SAME

FIELD OF THE INVENTION

This invention relates to water reducible or dispersible polyester resin compositions useful as textile sizes. It also relates to a method of preparing such polyester resin compositions by increasing the molecular weight of the polyester resin after it is dispersed in water.

BACKGROUND OF THE INVENTION

It is known that water dispersible polyester resins may be prepared by partially reacting trimellitic anhydride (TMA) with hydroxy terminated polyesters to produce polyesters containing sufficient carboxyl groups to make the polyester resin water soluble. This reaction is shown schematically below:

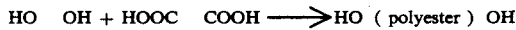

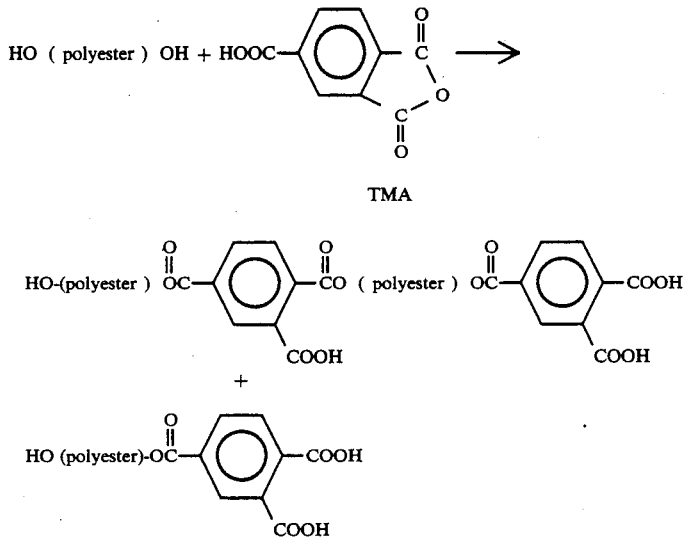

The resulting polyester composition is poured into water which contains an amine dispersing agent, e.g. triethyl amine. However, in order to avoid rapid boiling and foaming of the water/amine solution, the temperature of the molten polyester must be less than about 200°–220° C. Since the temperature at which the polyester remains molten is a function of the resin's Tg and molecular weight, an effective upper limit is thus placed on them. Also, if the Tg and molecular weight of the polyester is too high, the polyester will solidify or become too viscous in the water/amine mixture (even if the water/amine mixture is kept close to boiling) before the polyester can be dispersed. The addition of solvent to the polyester before dispersing it, in an effort to obviate these problems, is undesirable since the flash point would be lowered and organic pollutants to the atmosphere increased when the product is ultimately dried.

Known water dispersible polyesters include those sold by Eastman Chemical Products, Inc. under the designations WD 3652, WD 9519, WJL 6342, FPY 6762 and MPS 7762. These polyesters are described as having molecular chains whose end groups are mostly primary hydroxyl groups, and which have sodium sulfonate groups positioned along the molecular chain at random intervals. These sodium sulfonate groups contribute to water dispersibility. Also available from Eastman is an air-drying water-reducible alkyd enamel prepared from a resin designated as WA-17-2T. This resin is prepared from 10.56 eq. of TMPD glycol (2,2,4-trimethyl-1,3-pentanediol), 8.12 eq. of pentaerythritol, 9.00 eq. of isophthalic acid, and 4.43 eq. of linoleic fatty acid. The resulting polymer is then reacted with 4.72 eq. of trimellitic anhydride. Other Eastman products containing water-reducible polyesters are WS-3-1C, WA-17-6C and WS-3-2C enamels. WS-3-1C enamel is prepared from a polyester made from 17.16 eq. of 1,4-cyclohexanedimethanol; 8.59 eq. of trimethylolpropane; 14.85 eq. of phthalic anhydride and 10.90 eq. of adipic acid. WA-17-6C enamel is prepared using a polyester made from 5.94 eq. of 1,4-cyclohexanedimethanol; 15.10 eq. pentaerythritol; 8.67 eq. isophthalic acid; 3.18 eq. benzoic acid and 3.65 eq. linoleic fatty acid. The resulting polymer is further reacted with 3.93 eq. of trimellitic anhydride. WS-3-2C enamel employs a polyester prepared from 7.12 eq. 1,4-cyclohexanedimethanol; 1.40 eq. trimethylolpropane; 4.17 eq. phthalic anhydride and 2.78 eq. adipic acid.

High molecular weight (i.e., over 4500 molecular weight) water reducible polyester resins have also been developed by Amoco Chemicals Corporation. One such resin is a polyester diol of isophthalic acid and glycol which is coupled with trimellitic anhydride. The prepolymer mole ratio of isophthalic acid to glycol must be at least 4:5 and near stoichiometric amounts of trimellitic anhydrides are used. A typical such resin is prepared from 120 moles of isophthalic acid (or an 85/15 isomer blend of isophthalic and terephthalic acids) and 140 moles of diethylene glycol. Twenty moles of the resulting prepolymer diol is then reacted with 21 mole of trimellitic anhydride. Similar Amoco polyesters are prepared by reacting the same ingredients described above, except that the glycol component contains 91 moles of diethylene glycol and 49 moles of 1,4-cyclohexanedimethanol.

U.S. Pat. No. 3,546,008, issued Dec. 8, 1970 to Shields, et al. discloses sizing compositions containing linear, water-dissipatable polyesters derived from at least one dicarboxylic acid component, at least one diol component (at least 20 mole percent of the diol component being a poly (ethylene glycol)), and a difunctional monomer containing a —SO$_2$M group attached to an aromatic nucleus, where M is hydrogen or a metal ion.

U.S. Pat. No. 3,563,942, issued on Feb. 16, 1971 to Helberger, discloses linear copolyester compositions which can be dispersed in aqueous mediums. Water dispersibility is gained by the addition to the copolyesters of the metal salt of a sulfonated aromatic compound.

U.S. Pat. No. 3,734,874, issued May 22, 1973 to Kibler, et al., discloses water-dissipatable, meltable polyesters and polyesteramides. A polyester said to be typical is composed of 80 mole parts of isophthalic acid, 10 mole parts of adipic acid, 10 mole parts of 5-sodiosulfoisophthalate, 20 mole parts of ethylene glycol and 80 mole parts diethylene glycol.

U.S. Pat. No. 4,148,779, issued Apr. 10, 1979 to Blockwell, et al., discloses water-dispersible dye/resin compositions which are solutions of disperse dyes in, for example, copolyesters of 5-sodiosulfoisophthalic acid optionally blended with aliphatic or cycloaliphatic dicarboxylic acids.

U.S. Pat. No. 4,391,934, issued July 5, 1983 to Lesley, et al., discloses dry textile warp size compositions containing a polyester in particulate form, a film former and, optionally, a lubricant. The preferred polyester resin is produced by reacting a glycol such as diethylene glycol with a dicarboxylic acid, e.g., isophthalic acid, and trimellitic anhydride.

U.S. Pat. No. 4,401,787, issued Aug. 30, 1983 to Chen, discloses polyester latex compositions which contain a polyester having from 0.5 to 5.0 mole percent dicarboxylic acid derived repeating units having a component selected from salts of alkali metal or ammonium iminodisulfonyl and alkali metal or ammonium sulfonate.

U.S. Pat. No. 4,493,872, issued Jan. 15, 1985 to Funderburk, et al., discloses a water dispersible copolyester made from 65 to 90 mole percent of isophthalic acid, 0 to 30 mole percent of at least one aliphatic dicarboxylic acid, 5 to 15 mole percent of at least one sulfomonomer containing an alkali metal sulfonate group attached to a dicarboxylic aromatic nucleus, and stoichiometric quantities of about 100 mole percent of at least one copolyerizable aliphatic or cycloaliphatic alkaline glycol having 2 to 11 carbon atoms.

U.S. Pat. No. 4,525,419, issued June 25, 1985 to Posey, et al., discloses a water dispersible copolyester which is the condensation product of 60 to 70 mole percent of terephthalic acid, 15 to 25 mole percent of at least one dicarboxylic acid, greater than 6 up to 15 mole percent of at least one sulfomonomer containing an alkali metal sulfonate group attached to a dicarboxylic aromatic nucleus, and stoichiometric quantities of at least one aliphatic or cycloaliphatic alkylene glycol having 2 to 11 atoms.

SUMMARY OF THE INVENTION

In accordance with the present invention there is provided a process for preparing a dispersion of a polyester resin in water comprising:
(A) dispersing a molten carboxyl containing polyester in water which contains a neutralizing agent in an amount effective to disperse the polyester in the water;
(B) adding to the mixture produced in Step A an epoxide containing at least two epoxy groups per molecule capable of reacting with the carboxyl groups of the polyester in an amount less than that required stoichiometrically to react with all of the carboxyl groups while the mixture produced in step A is held at a temperature which will effect reaction of the carboxyl containing polyester and epoxide, but which is below the boiling point of the mixture; and
(C) mixing the product of step B until a dispersion is formed.

There is also provided in accordance with the present invention a process for preparing an aqueous dispersion of a polyester resin comprising:
(A) forming a carboxyl containing polyester resin which has a molecular weight and Tg which allows it to be dispersed in water by reacting a hydroxy terminated polyester and a stoichiometric excess of trimellitic anhydride;
(B) melting the product of step A and adding the molten product to water containing an effective amount of a dispersing agent;
(C) dispersing the product of step A in the water; and
(D) adding to the resulting dispersion an epoxide having at least two epoxy groups per molecule capable of reacting with the carboxyl group of the polyester resin, said epoxide being added in an amount less than that required stoichiometrically to react with all of the carboxyl groups and while the dispersion is held at a temperature which will effect reaction of the carboxyl containing polyester and epoxide, but which is below the boiling point of the dispersion.

In accordance with this invention there is further provided a chain extended, carboxyl containing polyester resin comprising a hydroxy terminated polyester condensation product of the following monomers or their polyester forming equivalents:
(A) about 49 to about 30 mole percent of a discarboxylic acid or mixture of dicarboxylic acids; and
(B) about 51 to about 70 mole percent of an aliphatic or cycloaliphatic glycol or mixture of aliphatic or cycloaliphatic glycols;
wherein about 20 to about 96 percent of the residual hydroxyl groups on the polyester have been reacted with trimellitic anhydride to form carboxyl groups on the polyester to yield an acid number of about 25 to about 90, and the polyester has been chain extended with an epoxide having at least two epoxy groups per molecule capable of reacting with the carboxyl groups in an amount sufficient to react with about 10 to about 90 percent of the carboxyl groups.

There is also provided in accordance with the present invention a chain extended, carboxyl containing polyester resin comprising the product produced by:
(A) forming a carboxyl containing polyester resin by reacting a hydroxyl terminated polyester resin and a stoichiometric excess of trimellitic anhydride; and
(B) chain extending the product by step A by reacting said product and an epoxide having at least two epoxy groups per molecule capable of reacting with carboxyl groups of said product in an amount less than that required stoichiometrically to react with all of the carboxyl groups of said product.

Further provided in accordance with this invention are aqueous dispersions comprising an aqueous continuous phase having dispersed therein a chain extended, carboxyl containing polyester resin comprising the product produced by:

(A) forming a carboxyl containing polyester resin by reacting a hydroxyl terminated polyester resin and a stoichiometric excess of trimellitic anhydride; and (B) chain extending the product of step A by reacting said product and an epoxide having at least two epoxy groups capable of reacting with the carboxyl groups of said product in an amount less than that required stoichiometrically to react with all of the carboxyl groups of said product.

The present invention also provides a method of sizing a yarn or textile comprising applying to the yarn or textile a coating of an aqueous dispersion comprising an aqueous continuous phase having dispersed therein a chain extended, carboxyl containing polyester resin comprising the product produced by:

(A) forming a carboxyl containing polyester resin by reacting a hydroxyl terminated polyester resin and a stoichiometric excess of trimellitic anhydride; and (B) chain extending the product of step A by reacting said product and an epoxide having at least two epoxy groups per molecule capable of reacting with the carboxyl groups of said product in an amount less than that required stoichiometrically to react with all of the carboxyl groups of said product; and drying or curing said coating.

This invention also includes the yarn or textile product produced by the above process.

There is further provided in accordance with this invention a coated substrate wherein the coating comprises the product produced by drying or curing an aqueous dispersion which has been applied to the surface of the substrate and wherein said dispersion comprises an aqueous continuous phase having dispersed therein a chain extended, carboxyl containing polyester resin comprising the product produced by:

(A) forming a carboxyl-containing polyester resin by reacting a hydroxyl terminated polyester resin and a stoichiometric excess of trimellitic anhydride; and (B) chain extending the product of step A by reacting said product and an epoxide having at least two epoxy groups capable of reacting with the carboxyl groups of said product in an amount less than that required stoichiometrically to react with all of the carboxyl groups of said product.

DETAILED DESCRIPTION OF THE PREFERRED EMBODIMENTS

The present invention relates to the concept that reacting multifunctional epoxy resins with water dispersed polyester resins that contain residual unreacted carboxyl groups gives higher molecular weight polyesters with enhanced physical properties. This reaction also allows the polymers to be crosslinked more readily due to increased hydroyl groups that are generated along the polyester backbone as the epoxy groups react with carboxyl groups.

The polyester resin dispersions and the method for making them may be outlined schematically as follows:

A. Produce Hydroxy Terminated Polyester

A hydroxy terminated polyester prepolymer is produced by reacting a slight excess (e.g. 14 moles) of a glycol with a dicarboxylic acid (e.g. 12 moles). The reaction can be depicted as:

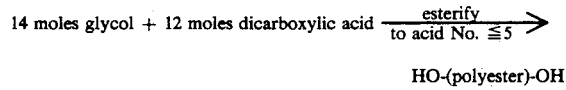

B. Produce Carboxyl Containing Polyester

Excess trimellitic anhydride (TMA) is reacted with part of the hydroxyl groups on the hydroxy terminated polyester to produce of polyester of acid no. of about 45–50. This reaction may be depicted as:

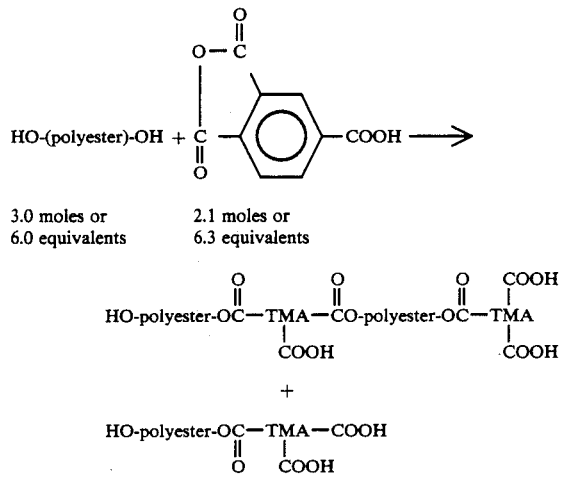

C. Disperse Carboxyl Containing Polyester

The carboxyl-containing polyester is poured molten (at 180°–220° C.) into a solution of hot triethyl amine and water. The triethyl amine neutralizes (or salts) the carboxyl groups on the polyester, as depicted below, and aids in dispersing it in the water.

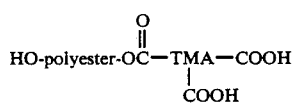

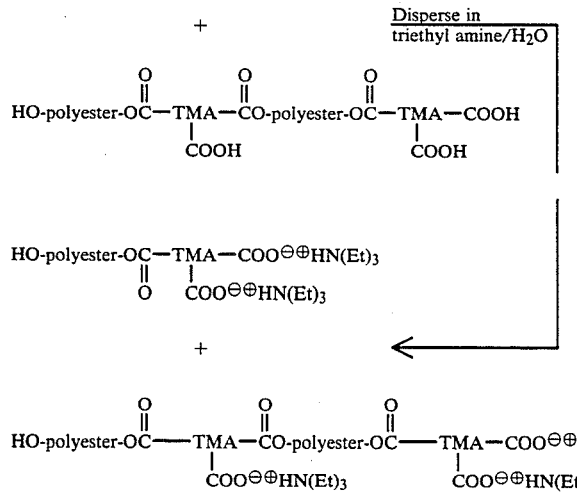

D. Extension of Polyester with Epoxide

A portion of the carboxyl groups on the dispersed polyester is reacted with a multifunctional epoxide to increase the molecular weight of the resin and increase the number of hydroxyl groups along the polyester backbone to provide cure sites for later reaction with a curing agent, e.g. melamine resins. The chain extension is depicted as follows:

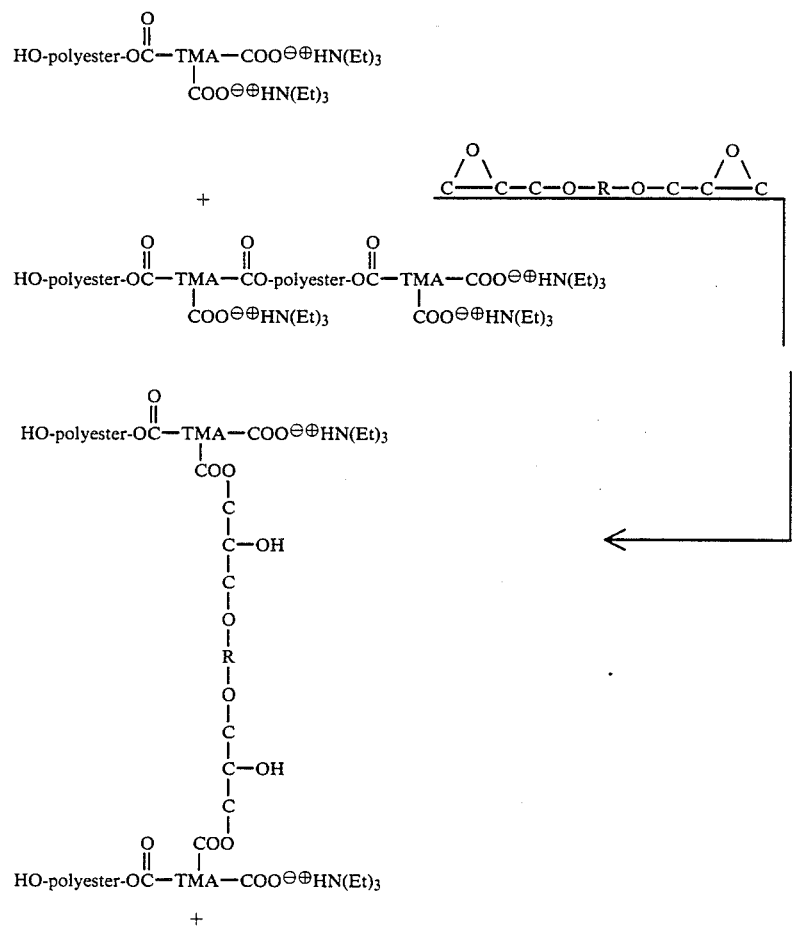

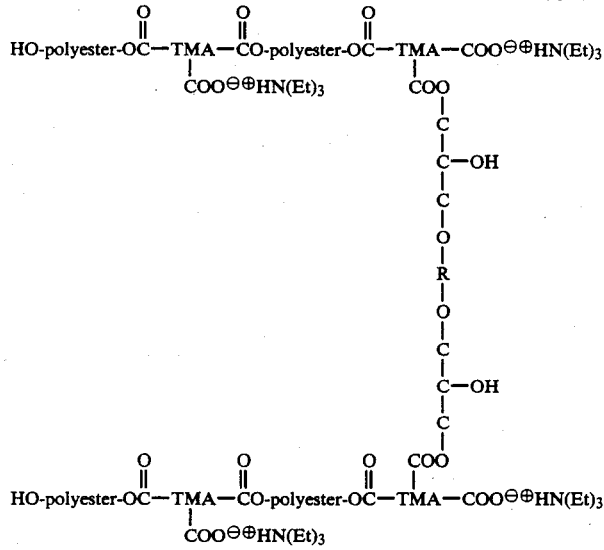

It is emphasized that the foregoing reaction scheme is intended to depict the reactions and products of the present invention only in a general manner so as to teach those skilled in the art how to make and use the present invention. It should be understood by those skilled in the art that many products and by-products other than the idealized structures indicated above will be produced when the present invention is practiced. Therefore, the above-depicted reaction scheme is intended for illustrative purposes only and is not intended to limit the present invention in any way.

The hydroxyl terminated polyester resins used to prepare the resins of the present invention may be made in a conventional manner from a dicarboxylic acid and a glycol. Suitable dicarboxylic acids include, but are not limited to isophthalic acid, terephthalic acid and adipic and other aliphatic acids. A mixture of isophthalic acid and terephthalic acid is preferred in order to prevent crystallization of the polyester. Suitable glycols include aliphatic glycols (such as ethylene glycol, butane diol, hexane diol), diethylene glycol and dimethylol propionic acid. A slight amount of trimethylol propane may also be advantageously added to the glycol to increase branching of the polymer. In preparing the hydroxyl terminated polyester a stoichiometric excess of the glycol is used in order to ensure that the polyester is hydroxyl terminated.

The compound used to provide carboxyl groups on the polyester is preferrably trimellitic anhydride (TMA) because of its high carboxyl content and functionality, but other compounds, such as phthalic anhydride or hexahydrophthalic anhydride may be used. These latter compounds, while not forming products identical to products made from TMA, do provide dispersions with the same characteristics and benefits of those made from TMA. Accordingly, for the purpose of this invention, these other anhydrides (and their products) are considered to be equivalent to TMA. Normally, about 10 to about 96 percent of the residual hydroxyl groups on the polyester are reacted with TMA to form carboxyl groups on the polyester. The resulting carboxyl-containing polyester has an acid number from about 25 to about 90.

Any base which will neutralize or salt the carboxyl groups on the polyester and render the resin water soluble may be employed as the neutralizing agent. Use of such neutralizing agents assists in dispersing the carboxyl containing polyester in the water. Examples of such bases include, but are not limited to, ammonia, alkyl amines (such as triethyl amine and tributyl amine), alkali metal hydroxides (such as NaOH and KOH), and alkanol amines (such as triethanol amine). A sufficient amount of base should be employed to salt substantially all of the carboxyl groups.

The epoxy compounds used to chain extend the polyester can be any of many readily available epoxy-containing compounds. Materials such as EPON 828 resin, Ciba GY-9482 resin and EPI-REZ resin 510 (epoxy resins which are all glycidyl ethers of bisphenol A) are typical examples. Epoxies such as EX-614 (tetrafunctional epoxy sorbitan), Dow DEN-438 resin (epoxy novalac), EPI-REZ 5048 resin (trifunctional aliphatic epoxy) and XU-238 resin (difunctional epoxy hydantoin) may also be used. Of these, the glycidyl ethers of bisphenol A are preferred. Normally, an amount of epoxy compound is employed such that about 10 to about 90 percent of the carboxyl groups on the polyester are chain extended with the epoxy compound.

The dispersions of the present invention comprise about 30–50 weight percent (on a solids basis) of the chain extended polyesters of this invention, the neutralizing base and the balance water. A surfactant may optionally be employed to increase the stability of the dispersion.

The dispersions of this invention are useful as sizes for textile yarns, such as nylon acetate or filament polyester yarn. The size is coated onto the yarn to protect the yarn from abrasion during the weaving process whereby the yarn is woven into fabric. In a typical such process, the polyester yarn is unwound from a creel frame and passed through a size box which contains the textile size at about 8–10% solids in water. The excess size is squeezed off through nip rolls and dried over steam heated dry cans (at about 200°–250° F.) until the yarn is dried to a moisture regain of 0.4 to 1.0%. The dried yarns are then separated from one another by a series of split rods and wound side by side onto a loom beam under controlled tension. The loom beam is then ready for weaving.

The continuous yarns with the applied size on the loom are known as the warp yarn. The unsized yarn that is attached to the shuttle and travels back and forth through the warp yarn is known as the fill yarn. It is the primary purpose of the resin size to act as a protective agent for the warp yarn against the abrasive forces that are encountered during weaving. (A break in one warp yarn requires the shutdown of the loom for retieing). The size coats each individual filament of the warp yarn and bonds all of the filaments together.

After the fabric is woven, the polyester size may be removed by subjecting the fabric to a mild alkaline scour (typically 0.2% sold ash and 0.2% surfactant with a bath temperature of 180°–200° F.). The scoured textile is then passed over dry cans and approximately 0.5% of the dried yarn weight would be retained size.

For some applications it is desirable to make the resin size permanent on the fabric. For instance, it may be used as a binder to hold pigment or dyestuff to the yarn. This process is known as slasher dyeing wherein pigment or dyestuff and a crosslinking or curing agent (such as a melamine) and a catalyst for the crosslinking or curing agent (such as citric acid when a melamine is used) are added to the slasher bath with the polyester resin size dispersion. The crosslinking agent crosslinks residual hydroxyl and carboxyl groups on the polyester to make the polyester size permanently hold the pigment or dyestuff to the yarn.

The dispersions of the present invention are also useful to coat substrates, e.g., polymeric films such as polyester film. The coating may be applied to the substrate to provide a gloss coating or as an adhesive layer between two substrates.

The present invention provides several advantages over the prior art. First, the method of making the polyester resins permits high molecular weight polyesters to be made without causing gellation of the resin and avoiding the aforementioned problem of causing the water/dispersing agent solution to boil upon addition of the molten resin to it. Second, the polyester resin dispersions of this invention provide sizes with excellent toughness, abrasion resistance, water release, resiliency and less water regain compared to the sizes currently available. Also, the reaction with the epoxides provides additional hydroxyl functionality to the polyester resin which aids in curing when the resin is crosslinked with, e.g., melamines.

EXAMPLE 1

This example illustrates the preparation of a hydroxy terminated polyester which may be used to prepare the polyester resins of the present invention.

The following starting materials were charged to a suitable reaction vessel at room temperature:

| Starting Material | Moles | Wt. % |
|---|---|---|
| Ethylene glycol | 3.5 | 6.42 |
| Diethylene glycol | 8.5 | 26.66 |
| 1,4-Butane diol | 3.0 | 7.99 |
| Terephthalic acid | 1.8 | 8.84 |
| Isophthalic acid | 10.2 | 50.09 |

The resulting reaction mixture was then heated to about 135° C. with a nitrogen sparge and about 0.1 wt% of a catalyst (Fascat 4100) was added to the reaction mixture. The reaction was continued for about 3.5 hours, with the temperature of the reaction mixture rising steadily to about 230° C. and approximately 435 g. of by-product water being produced fro a 3383 g. charge. The reaction was stopped and the product, a hydroxy terminated polyester resin, was stored under nitrogen overnite.

EXAMPLE 2

This example illustrates the preparation of a carboxyl-containing polyester resin which may be used to prepare the polyester resins of the present invention.

The hydroxy terminated polyester of Example 1 was heated in a suitable reaction vessel to about 160° C., and the esterification allowed to continue until the acid no. dropped from about 11.8 to about 2.9 during which time the temperature of the reaction mixture rose to about 243° C. and additional by-product water was given off.

The reaction mixture was then cooled to about 190° C. and 2.1 moles of trimellitic anhydride were added. The reaction mixture was heated to about 220° C. until an acid no. of about 45–47 was achieved.

The resulting carboxyl-containing polyester resin was maintained in a molten state at about 190° C. About 2550 g of the molten polyester was then poured into a hot (about 65°–70° C.) aqueous solution containing about 5750 g. deionized water and 202 g. triethyl amine, and the resin dispersed therein. The resulting dispersion contained about 30% solids.

EXAMPLE 3

This example illustrates the chain extension of a carboxyl-containing polyester with a multifunctional epoxide to produce an aqueous dispersion of a polyester resin of this invention.

About 8500 g of the dispersion produced in Example 2 was charged to a suitable reaction vessel and heated to about 55° C. About 141 g of a multifunctional epoxy resin (a liquid epoxy resin having an epoxide equivalent of 195 and a viscosity at 25° C. of about 16,000 cps, sold by Ciba-Geigy Corp. under the designation ARALDITE GY-9482 resin) was added to the vessel along with about 330 g of water.

The reaction was allowed to proceed for about 1.5 hours at 60°–65° C. and then the reaction mixture was cooled to room temperature. The resulting product had a pH of 7.04, a viscosity of about 38 cps (#2 spindle at 100 rpm), was semi-transparent in appearance and contained 30% solids.

EXAMPLE 4

The procedure of Example 3 was repeated using the following multifunctional epoxies:

EX-614—tetrafunctional epoxy sorbitan sold by Nagase Chemicals Ltd.

EPI-REZ 5048—trifunctional aliphatic epoxy resin sold by Interez Inc.

Dow DEN-438—3.6 functional epoxy novolak sold by The Dow Chemical Co.

XU-238—Hydantoin difunctional epoxy resin sold by Ciba-Geigy Corp.

The resulting polyester resins had the following properties:

| | Epoxy Used | | | |
|---|---|---|---|---|
| | EX-614 | Epi-Rez 5048 | Dow DEN-438 | XU-238 |
| Viscosity | Thick | Moderately Thick | Thick | Moderately Thick |

-continued

| | Epoxy Used | | | |
|---|---|---|---|---|
| | EX-614 | Epi-Rez 5048 | Dow DEN-438 | XU-238 |
| Solids | 30% | 30% | 30% | 30% |

EXAMPLE 5

The molecular weight distribution was determined for the products of Examples 1 and 3 by preparing 2% solutions of each resin in tetrahydrofuron(THF). The samples were filtered and then injected into a liquid chromatograph utilizing a set of non-aqueous gel permeation columns with THF as the mobile phase. The column effluent was monitored with a U.V. diode array detector and a refractive index (R.I.) detector maintained at 40° C. The columns were calibrated with a series of polystyrene standards ranging in molecular weight from 890 Daltons to 1,260,000 Daltons. The R.I. detector signal was used for the calculation of the molecular weight distribution parameters listed below:

| | Free Monomer Analysis | | |
|---|---|---|---|
| Monomer | Resin From Example 1 | Resin From Example 3 | Method |
| Ethylene glycol | 0.04% | 0.02% | GC |
| 1,4-Butanediol | Less than 0.01% | Less than 0.01% | GC |
| Diethylene glycol | 0.06% | 0.05% | GC |
| Isophthalic acid | Less than 1.5% | Less than 1.0% | LC |
| Terephthalic acid | Less than 1.5% | Less than 1.0% | LC |
| Trimellitic anhydride | Less than 1.5% | Less than 1.0% | LC |
| Epoxy | — | Less than 1.0% | LC |

| Molecular Weight Distribution By Gel Permeation Chromatography | | |
|---|---|---|
| Parameter | Resin From Example 1 | Resin From Example 3 |
| Number avg. M.W. ($M_n$) | 8,000 | 8,000 |
| Weight avg. M.W. ($M_W$) | 30,000 | 67,000 |
| Z-avg. M.W. ($M_z$) | 63,000 | 165,000 |
| M.W. at sample maximum | — | — |
| % sample less than 1000 M.W. | 2 | 2 |
| % sample less than 500 M.W. | Less than 0.5% | Less than 0.5% |

EXAMPLE 6

This example illustrates the use of a polyester resin size of the present invention in a slasher dyeing process.

Slasher dyeing sizes were prepared having the following formulation:

| Ingredient | Parts By Weight |
|---|---|
| Water | 303.6 |
| Ammonium nitrate | 2.0 |
| Melamine crosslinker | 2.4 |
| Size from Table A | 80.0 |
| Pigment or Dyestuff | 12.0 |

Formulations were tested using the following polyester resin sizes:

TABLE A

| Resin Designation | Composition |
|---|---|
| A | Resin made according to Example 2 with 1,4-butanediol substituted for the diethylene glycol. |
| B | Resin made according to Example 3 with neopentyl glycol substituted |

TABLE A-continued

| Resin Designation | Composition |
|---|---|
| | for the diethylene glycol. |
| C | Resin from Example 2. |
| D | Resin made according to Example 3 with diethylene glycol substituted for the 1,4-butanediol. |
| E | Resin from Example 3. |
| F | EASTMAN WD Resin |
| G | Resin made according to Example 3 with neopentyl glycol substituted for the 1,4-butanediol (1,4-BDO) and a higher ratio of diethylene glycol (DEG) to neopentyl glycol than the ratio of DEG to 1,4-BDO in Example 3. |

Each in turn of these sizes was padded onto unfinished polyester cloth and dried in an oven at 250° F. for 2.5 minutes. The material was then divided into three parts. One part was cured at 275° F. for 1 minute, the second part was cured at 350° F. for 1 minute and the third part was left uncured.

The samples were rated for color fastness and solvent resistance with the following results:

| Size | |
|---|---|
| E | Best |
| B | ↓ |
| G | ↓ |
| D | ↓ |
| A | ↓ |
| C | ↓ |
| F | Worst |

What we claim is:

1. A process for preparing a dispersion of a polyester resin in water comprising:
   A. dispersing a molten carboxyl containing polyester in water which contains a neutralizing agent in an amount effective to disperse the polyester in the water;
   B. adding to the mixture produced in step A an epoxide containing at least two epoxy groups per molecule capable of reacting with the carboxyl groups of the polyester in an amount less than that required stoichiometrically to react with all of the carboxyl groups while the mixture produced in step A is held at a temperature which will effect reaction of the carboxyl containing polyester and epoxide, but which is below the boiling point of the mixture; and
   C. mixing the product of step B until a dispersion is formed.

2. A process according to claim 1 wherein the epoxide is a glycidyl ether of bisphenol A.

3. A process for preparing an aqueous dispersion of a polyester resin comprising:
   A. forming a carboxyl containing polyester resin which has a molecular weight and Tg which allow it to be dispersed in water by reacting a hydroxyl terminated polyester and a stoichiometric excess of trimellitic anhydride;
   B. melting the product of step A and adding the molten product to water containing an effective amount of a neutralizing agent;
   C. dispersing the product of step A in the water;

D. adding to the resulting dispersion an epoxide having at least two epoxy groups per molecule capable of reacting with the carboxyl groups of the polyester resin, said epoxide being added in an amount less than that required stoichiometrically to react with all of the carboxyl groups and while the dispersion produced in step A is held at a temperature which will effect reaction of the carboxyl containing polyester and epoxide, but which is below the boiling point of the dispersion.

4. A process according to claim 3 wherein the epoxide is a glycidyl ether of bisphenol A.

5. A chain extended carboxyl containing polyester resin comprising a hydroxyl terminated polyester condensation product of the following monomers or their polyester forming equivalents:

A. about 49 to about 30 mole percent of a dicarboxylic acid or mixture of dicarboxylic acids; and B. about 51 to about 70 mole percent of an aliphatic or cycloaliphatic glycol or mixture of aliphatic or cycloaliphatic glycols; and wherein about 20 to about 96 percent of the residual hydroxyl groups on the polyester have been reacted with trimellitic anhydride to form carboxyl groups on the polyester to yield an acid number of about 25 to about 90, and the polyester has been chain extended with an epoxide having at least two epoxy groups per molecule capable of reacting with the carboxyl groups in an amount sufficient to react with about 10 to about 90 percent of the carboxyl groups.

6. A polyester resin according to claim 5 wherein the epoxide is a glycidyl ether of bisphenol A.

7. A chain extended, carboxyl-containing polyester resin comprising the product produced by:

A. forming a carboxyl-containing polyester resin by reacting a hydroxyl terminated polyester resin and a stoichiometric excess of trimellitic anhydride; and B. chain extending the product of step A by reacting said product and an epoxide having at least two epoxy groups per molecule capable of reacting with the carboxyl groups of said product in an amount less than that required stoichiometrically to react with all of the carboxyl groups of said product.

8. A polyester resin according to claim 7 wherein the epoxide is a glycidyl ether of bisphenol A.

9. An aqueous dispersion comprising an aqueous continuous phase having dispersed therein a chain extended, carboxyl containing polyester resin comprising the product produced by:

A. forming a carboxyl containing polyester resin by reacting a hydroxyl terminated polyester resin and a stoichiometric excess of trimellitic anhydride; and B. chain extending the product of step A by reacting said product and an epoxide having at least two epoxy groups per molecule capable of reacting with the carboxyl groups of said product in an amount less than that required stoichiometrically to react with all of the carboxyl groups of said product.

10. An aqueous dispersion according to claim 9 wherein the epoxide is a glycidyl ether of bisphenol A.

* * * * *